Aug. 8, 1961 L. L. LAKATOS 2,995,627

AUTOMATIC FREQUENCY CONTROL FOR FSK TELEGRAPH RECEIVER

Filed April 29, 1954

INVENTOR.
Louis L. Lakatos
BY
F. A. Rechif
AGENT

United States Patent Office 2,995,627

Patented Aug. 8, 1961

2,995,627

AUTOMATIC FREQUENCY CONTROL FOR FSK TELEGRAPH RECEIVER

Louis L. Lakatos, Philadelphia, Pa., assignor, by mesne assignments, to the United States of America as represented by the Secretary of the Navy Filed Apr. 29, 1954, Ser. No. 426,370
7 Claims. (Cl. 178—88)

This invention relates to an automatic frequency control system, and more particularly to a system of this kind for frequency shift keyed (FSK) telegraph receivers.

In frequency shift telegraphy, the transmitted frequency is shifted or keyed in accordance with intelligence, from one frequency representing mark to another frequency representing space. In other words, in FSK telegraphy, marking characters may be represented by current of one frequency and spacing characters by current of a frequency separated from said one frequency by several hundred cycles, these marking and spacing frequencies being alternatively present in the output of the transmitter.

For optimum operation of the intermediate frequency circuits in the receiver and for other purposes, it is necessary to maintain the local heterodyne oscillator in the receiver accurately at a frequency bearing a fixed relationship to the mean frequency of the received FSK signal, and for this, some form of automatic frequency control (AFC) is generally required. Prior AFC systems for FSK telegraph receivers were of two general types: namely, (1) systems in which the average of mark and space frequencies was taken and then sensed for frequency control purposes, and (2) systems in which either the mark or the space frequency was sensed for control purposes. The first type suffers from several disadvantages, among which may be mentioned the slow response due to the inherently slow averaging process, and the frequency correction errors resulting from weighted keying or from standby on one of the two frequencies. The second type has the disadvantage of an intermittent control signal and thus requires a storage device such as an electromechanical corrector (motor and tuning condenser) to hold the information during the portions of the received sginal which are not used for frequency control purposes.

It is known to overcome the disadvantages mentioned through the use of two discriminators, one centered on mark frequency and the other on space frequency, the two discriminator outputs being added. Such a system provides an accurate, continuous and quick correction signal, but has the drawback of operating properly on only one value of frequency shift, that for which the discriminators are designed.

One of the main objects of the present invention is to devise a frequency control system for FSK telegraph receivers, which will provde an accurate, continuous and quick correction signal, and which in addition is readily adjustable for a rather wide range of frequency shifts, up to the limits of the passbands of certain filters used in the system.

The objects of this invention are accomplished, briefly, in the following manner: the frequency shift keyed output of the receiver, for example in the intermediate frequency (IF) range, may be passed through filters to separate the mark and space signals, following which, in one embodiment, a beat oscillator having a frequency equal to the frequency shift of the signal, is used to beat the mark signal to the same frequency as the space signal. The resulting signal at space frequency and the space signal itself are both applied to a tuned discriminator centered on the space frequency, the output of this discriminator being utilized for frequency control of the main heterodyne oscillator of the receiver. In another embodiment, the beat oscillator has a frequency equal to half of the frequency shift of the signal, and this oscillator beats both the mark and space signals to the center frequency (nominal carrier) of the signal, the discriminator in this case being centered on the nominal carrier of the signal. In either embodiment, by adjustment of the frequency of the beat oscillator different frequency shifts can be accommodated. In still another embodiment, the filters used to separate the mark and space signals are eliminated.

The foregoing and other objects of the invention will be best understood from the following description of some exemplifications theerof, reference being had to the accompanying drawing, wherein.

Figures 1, 2, 3:
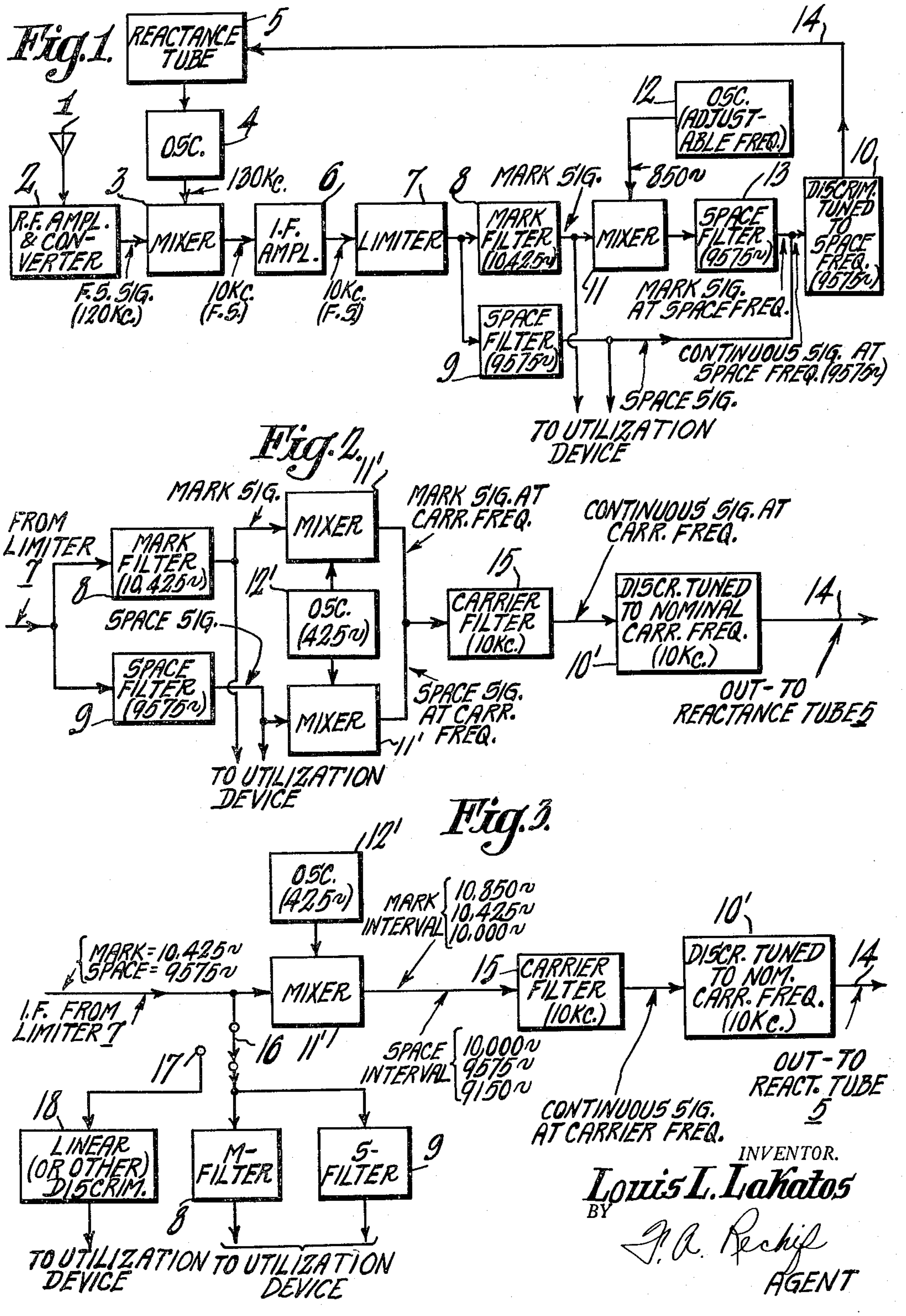
FIG. 1 is a block diagram of one arrangement according to this invention.
FIG. 2 is a partial block diagram of another embodiment of the invention.
FIG. 3 is a partial block diagram of still another embodiment.

Referring now to FIG. 1, the frequency shift telegraph signal radiated from a remote radio transmitter is picked up by a receiving antenna 1 and fed therefrom to a radio frequency amplifier and converter unit 2, wherein the received signal is amplified and converted to a frequency shift signal having a mean frequency in the low IF range, for example 120 kc. This frequency shift keyed signal of 120-kc. mean frequency is fed to a first mixer 3 to be mixed therein with the output of an oscillator 4 operating at 130 kc., to provide a diffeernce frequency of 10 kc. In other words, the output of mixer 3 may be a frequency shift keyed signal of 10-kc. mean frequency. Oscillator 4 is the local heterodyne oscillator of the receiver and the frequency of this oscillator is controlled by the system of this invention, by the action of a reactance tube 5 coupled to this oscillator and supplied with a variable control signal in response to frequency error of such oscillator.

The output of mixer 3 is amplified in an IF amplifier 6, and the output of this amplifier is applied to a limiter 7 which removes any remaining amplitude variations from the signal. The output of limiter 7 is of the same form as the output of mixer 3, namely, a frequency shift keyed signal of 10-kc. mean frequency. The frequency shift of this signal may be 850 cycles, for example, and if such is the case the output of limiter 7 consists of a keyed frequency shifted signal alternatively of mark frequency, 10,425 cycles, or of space frequency, 9575 cycles. The output of limiter 7 is applied in parallel to the inputs of two filters 8 and 9, a mark filter 8 tuned to pass 10,425 cycles and a space filter 9 tuned to pass 9575 cycles. The mark signal is selected from the keyed output of limiter 7 by filter 8 and the space signal is selected from the keyed output of this limiter by filter 9. The mark signal output of filter 8 and the space signal output of filter 9 are fed to a suitable utilization device (not shown) for utilization therein in the form of telegraphic intelligence.

A portion of the space signal output of filter 9 is applied directly to the input of a tuned frequency discriminator 10, for frequency control purposes. Space filter 9 supplies space frequency signal input to discriminator 10 during space intervals of the keyed signal wave output of limiter 7. A portion of the mark signal output of filter 8 is applied to a second mixer 11, to be mixed or heterodyned therein with the output of an adjustable-frequency beat oscillator 12 having a frequency equal to the frequency shift of the received telegraph signal. For example, if the frequency shift of the FSK telegraph signal is 850 cycles, then the frequency of oscillator 12 is 850 cycles. In the mixer 11, the mark signal of 10,425 cycles is heterodyned down by means of the beat oscillator 12 to the space frequency of 9575 cycles, since the frequency of oscillator 12 is the same as the frequency shift of the signal, from the mark frequency to the space frequency.

According to this first embodiment of the invention, one of the two portions of the keyed signal (for example, the mark portion) is heterodyned to the same frequency as the other portion (space portion) of the keyed signal; and this heterodyning is effected by means of the beat oscillator 12 whose frequency is equal to the amount of the frequency shift between the mark and space portions. By simply adjusting the frequency of oscillator 12 to be at all times equal to the frequency shift of the received signal, the system is readily accommodated to various frequency shifts of the received signal, within the limits of the passband of the filter 13 which follows mixer 11 and to which the output of this mixer is applied. Thus, the system of this invention is readily adjustable for a rather wide range of frequency shifts of the received signal.

The output of mixer 11 is applied to the input of a space filter 13 tuned to pass 9575 cycles, which filter eliminates undesired frequencies and passes the space frequency of 9575 cycles on to the input of discriminator 10, along with the output of filter 9 which is also applied to such discriminator input, as previously described. Filter 13 may be substantially exactly like filter 9 and both of these filters pass the same space frequency of 9575 cycles. Since the signal output of filter 13 is derived from the output of mark filter 8, and since the output of filter 13 is at the space frequency of 9575 cycles, filter 13 supplies space frequency signal input to discriminator 10 during mark intervals of the keyed signal wave output of limiter 7. In other words, the output of filter 13 is mark signal at space frequency.

Since the output of filter 13 is mark signal at space frequency and the output of filter 9 is space signal (which is of course at space frequency), and since either mark or space signal is always present in the keyed signal being received, the input to discriminator 10 is a continuous signal at the space frequency of 9575 cycles. The discriminator 10 is tuned to or centered at the space frequency of 9575 cycles, and may be of any well-known design. This discriminator operates in a known way to develop a D.C. voltage in its output connection 14 in response to any deviation of the discriminator input frequency from the predetermined desired value of 9575 cycles, this voltage being either zero, positive or negative, depending on the amount and the direction of the variation of the discriminator input frequency from the desired predetermined value of 9575 cycles. The voltage developed in output connection 14 is applied to reactance tube 5 to control the frequency of oscillator 4 in such a direction as to bring the output of mixer 3 to substantially exactly 10 kc. carrier frequency, thus bringing the discriminator input frequency to substantially exactly 9575 cycles, which is the desired space frequency. All of the components of the receiver, including IF amplifier 6, then operate substantially exactly at the frequency for which they are designed, providing optimum operation of the receiver.

Since this invention provides a continuous signal (regardless of keying) of a single frequency at the input to the discriminator, no averaging process is necessary and the frequency control is thus effected in an accurate, continuous and rapid manner, and no storage device is necessary.

Instead of the tuned frequency discriminator 10, it is entirely possible to use, in the system of this invention, a phase detector or discriminator (untuned) in which the continuous signal at space frequency is compared with the output of a stable-frequency reference oscillator. Speaking generally, the frequency control action resulting from an arrangement of this type is similar to that (previously described) resulting from the arrangement including discriminator 10.

It is also possible to utilize a voltage-sensitive capacitor, or some other voltage-sensitive frequency-controlling component, in place of the reactance tube 5, for controlling the frequency of the oscillator 4 in response to the frequency control voltage appearing in lead 14. Such an equivalent is also within the scope of this invention.

In the system of FIG. 1 (and this also applies to FIG. 2) the mark and space signals are separated from each other immediately after the limiter 7, by means of the mark filter 8 and the space filter 9. With the filters in this location, the unwanted frequency can readily be suppressed 50 to 60 db, and then the two frequencies thus separated can be independently applied to the utilization device in an optimum manner without any interference with each other and without any interaction therebetween. Thus, no telegraph distortion is produced. Also, only the mark frequency is applied to mixer 11, so that only this frequency (and not the space frequency) is heterodyned by the beat oscillator 12, minimizing the filtering action required of filter 13.

It may be noted that keeping the control signal (input to discriminator 10) centered at 9575 cycles has the effect of keeping the space frequency at the same point, which is also the center of the passband of the space filter 9. In the example given, the mark filter is 850 cycles above the space filter, so that the mark signal is automatically centered on the mark filter. For shifts other than 850 cycles, the mark signal is no longer centered on the mark filter, but is below or above the center, depending on whether the frequency shift is less or greater than 850 cycles. With flat-top-characteristic filters, a moderate amount of dissymmetry can be tolerated. However, by the use of a symmetrical control circuit this dissymmetry, and its accompanying drawbacks, can be eliminated. Such a circuit is disclosed in FIG. 2.

In FIG. 2, which is somewhat simplified as compared to FIG. 1, elements the same as those of FIG. 1 are denoted by the same reference numerals, while those analogous to FIG. 1, but not exactly the same, are denoted by primed reference numerals.

In FIG. 2, a portion of the mark signal output of mark filter 8 is fed to a mixer 11', to be mixed or heterodyned therein with the output of a beat oscillator 12' having a frequency equal to one-half the frequency shift of the received telegraph signal. For example, if the frequency shift of the FSK telegraph signal is 850 cycles, then the frequency of oscillator 12' is 425 cycles. In the mixer 11', the mark signal of 10,425 cycles is heterodyned down by means of the beat oscillator 12' to the nominal carrier frequency or mid-frequency of 10 kc., since the frequency of oscillator 12' is one-half the frequency shift of the signal, from mark to space.

A portion of the space signal output of space filter 9 is fed to a mixer 11'', to be mixed or heterodyned therein with the output of the beat oscillator 12'. In the mixer 11'', the space signal of 9575 cycles is heterodyned up by means of the beat oscillator 12' to the nominal carrier frequency or mid-frequency of 10 kc.

In the embodiment of FIG. 2, the mark portion and the space portion of the keyed signal are both heterodyned to the nominal carrier frequency or mid-frequency of the keyed signal, the heterodyning being effected in both cases by means of the beat oscillator 12' whose frequency is equal to one-half the amount of the frequency shift between the mark and space portions. Since the signal output of mixer 11' is derived from the output of mark filter 8, and since the output of this mixer is at the nominal carrier frequency of 10 kc., the output of said mixer is mark signal at carrier frequency. Similarly, since the signal output of mixer 11'' is derived from the output of space filter 9, and since the output of this mixer is at the nominal carrier frequency of 10 kc., the output of said mixer is space signal at carrier frequency.

The outputs of mixers 11' and 11'' are both applied to the input of a single common carrier filter 15 tuned to pass 10 kc., which filter eliminates undesired frequencies and passes the carrier frequency of 10 kc. on to the input of a discriminator 10'. Since the output of mixer 11' is mark signal at carrier frequency and the output of mixer 11'' is space signal at carrier frequency and since either mark or space signal is always present in the keyed signal being received, the output of filter 15 (input to discriminator 10') is a continuous signal at the nominal carrier frequency of 10 kc. The discriminator 10' is tuned to or centered at the nominal carrier frequency of 10 kc., and operates similarly to discriminator 10, to develop a voltage in its output connection 14 in response to any deviation of the discriminator input frequency from the predetermined desired value of 10 kc. Again, the voltage developed in output connection 14 is applied to reactance tube 5 to control the frequency of oscillator 4 in such a direction as to bring the output of mixer 3 to substantially exactly 10 kc. carrier frequency, thus bringing the discriminator input frequency to substantially exactly 10 kc., which is the desired nominal carrier frequency.

The adjustment of the low frequency beat oscillators 12 or 12' (if oscillator 12' is adjustable) can be readily and accurately made by observing the waveform at the discriminator output. When these oscillators are incorrectly adjusted, a keyed square wave will be observed, and this wave will decrease in amplitude as the oscillator approaches the correct frequency, at which the wave reduces to a straight line.

While the frequency control system so far described is conveniently applied to frequency shift receiving systems using mark and space filters, it is also readily applicable to systems using a linear or other type of discriminator, that is, to systems not using mark and space filters in the frequency control channel. A system of this latter type is illustrated in FIG. 3, which is also somewhat simplified as compared to FIG. 1, and to which reference will now be made.

In FIG. 3, the intermediate frequency output of limiter 7 (a frequency shift keyed signal in which mark is 10,425 c.p.s. and space is 9575 c.p.s.) is applied directly to a mixer 11', without first going through any filters for the separation of mark and space signals. In mixer 11', the FSK signal is heterodyned with the output of a beat oscillator 12' having a frequency equal to one-half the frequency shift FS of the received telegraph signal. As in FIG. 2, the frequency of oscillator 12' may be 425 c.p.s.

During space interval, the space frequency of 9575 c.p.s. heterodynes with the 425-c.p.s. output of oscillator 12' to produce the three closely-situated frequencies of 10,000 c.p.s., 9150 c.p.s. (the sum and difference of the two frequencies) and the space frequency itself, 9575 c.p.s. During mark interval, the mark frequency of 10,425 c.p.s. heterodynes with the output of oscillator 12' to produce the three closely-situated frequencies of 10,850 c.p.s., 10,000 c.p.s. (the sum and difference of the two frequencies) and the mark frequency itself, 10,425 c.p.s. Thus, the nominal carrier frequency or mid-frequency of 10 kc. (10,000 c.p.s.) is produced during both mark and space intervals, and is always present in the output of mixer 11'.

The output of mixer 11' is applied to the input of a carrier filter 15 tuned to pass 10 kc., the output of this filter being a continuous signal at the nominal carrier frequency of 10 kc. The discriminator 10' operates to effect frequency control or stabilization of oscillator 4, in exactly the same manner as previously described in connection with FIG. 2.

The circuit of FIG. 3 represents a simplification over that of FIG. 2, in that one of the pair of mixers 11', 11'' of FIG. 2 is eliminated.

The FSK telegraph signal from limiter 7 in FIG. 3 may be utilized by various types of keying discriminators, two of which are illustrated. With the connection 16 (represented as a switch) in the position illustrated, the limiter output is fed to the mark filter 8 and the space filter 9, the outputs of these filters being fed to a suitable utilization device, exactly as in FIGS. 1 and 2. Alternatively, with switch 16 in its other position (on contact 17), the output of limiter 7 is fed to a linear or other type of keying discriminator 18, the output of which goes to a suitable utilization device for utilization of the telegraphic intelligence in the received FSK signal.

Thus, in addition to the aforementioned simplification over FIG. 2, FIG. 3 illustrates the use of types of keying discriminators other than those used in FIGS. 1 and 2.

What is claimed is:

1. In a receiver for frequency shift keyed mark and space waves, a first local oscillator, means for mixing waves from said oscillator with the received waves to produce intermediate frequency waves, a space filter for passing only intermediate frequency waves corresponding to space frequency, means for applying said produced intermediate frequency waves to the input of said filter, a mark filter for passing only intermediate frequency waves corresponding to mark frequency, means for applying said produced intermediate frequency waves through connections devoid of any other mixing means to the input of said mark filter, a utilization device connected directly across the outputs of said space and mark filters, a second local oscillator, the frequency shift between mark and space frequencies and the frequency of said second oscillator having a multiple relationship, the multiple being not over two, means for mixing waves from the output of said mark filter with waves from said second oscillator to produce altered frequency waves, a filter for passing waves of said altered frequency, means for applying said altered frequency waves to the input of said last-mentioned filter, a reactance tube for controlling the frequency of said first oscillator, a tuned frequency discriminator having its output coupled to said reactance tube, means for coupling waves from the output of said last-mentioned filter to the input of said discriminator, and connections for applying waves of a frequency equal to said altered frequency, derived at least in part from the output of said space filter, to the input of said discriminator.

2. A receiver as defined in claim 1, wherein said altered frequency is the mean of said mark and space frequencies, wherein the frequency of said second oscillator is equal to one-half of the frequency shift between mark and space frequencies, and wherein said discriminator is tuned to said mean frequency.

3. A receiver as defined in claim 1, wherein said altered frequency is the mean of said mark and space frequencies, wherein the frequency of said second oscillator is equal to one-half of the frequency shift between mark and space frequencies, wherein said discriminator is tuned to said mean frequency, and wherein said last-named connections comprise a mixer, means for coupling waves from the output of said space filter to said mixer, means for coupling waves from said second oscillator to said mixer, and means coupling the output of said mixer to the input of said altered-frequency filter.

4. A receiver for mark and space signals of a frequency shift signalling system, the received signals being frequency shifted on both sides of a nominal carrier frequency, said receiver comprising a local oscillator; control means for controlling the frequency of said local oscillator; a mixer for mixing waves from said oscillator with received signals to produce space and mark signals of predetermined but different frequencies on both sides of a mean frequency; output means from said mixer, said output means comprising a space filter and a mark filter, said filters respectively passing only the space and mark signals, and individual outputs from said filters for connection to utilization devices for space and mark signals; a second local oscillator producing a mixing signal having a frequency which is a multiple of the difference in frequency of the space and mark signals, said multiple being not over two, a mixer means mixing the signals from said second local oscillator and at least one signal of said space and mark signals; a third filter and discriminator connected thereto tuned to a signal from said mixer means; connection means connecting said third filter to the output of said mixer means; and means connecting said discriminator to said control means of said first oscillator.

5. A receiver as defined in claim 4 wherein said second oscillator produces mixing signals equal to one-half the difference frequency between said space and mark signals, said mixer means comprises a separate mixer having an output connected to said space filter and a separate mixer having an output connected to said mark filter, the last two said mixers having outputs connected to the input of said third filter, said third filter and discriminator being tuned to said mean frequency.

6. In a receiver for frequency shift keyed mark and space waves, a first local oscillator, means for mixing waves from said oscillator with the received waves to produce intermediate frequency waves, a space filter for passing only intermediate frequency waves corresponding to space frequency, means for applying said produced intermediate frequency waves to the input of said filter, a mark filter for passing only intermediate frequency waves corresponding to mark frequency, means for applying the last said produced intermediate frequency waves through connections devoid of any other mixing means to the input of said mark filter, a utilization device connected directly across the outputs of said space and mark filters, a second local oscillator, the frequency shift between mark and space frequencies and the frequency of said second oscillator having a multiple relationship, the multiple being not over two, means for mixing waves from the output of said mark filter with waves from said second oscillator to produce altered frequency waves, a filter for passing waves of said altered frequency, means for applying said altered frequency waves to the input of said last-mentioned filter, a reactance tube for controlling the frequency of said first oscillator, a tuned frequency discriminator having its output coupled to said reactance tube, means for coupling waves from the output of said last-mentioned filter to the input of said discriminator, connections for applying waves of a frequency equal to said altered frequency, derived at least in part from the output of said space filter, to the input of said discriminator, said altered frequency being equal to space frequency, the frequency of said second oscillator being equal to the frequency shift between mark and space frequencies, said discriminator being tuned to space frequency, and said last-named connections comprise a coupling between the output of said space filter and the output of said altered-frequency filter.

7. A receiver for mark and space signals of a frequency shift signalling system, the received signals being frequency shifted on both sides of a nominal carrier frequency, said receiver comprising a local oscillator; control means for controlling the frequency of said local oscillator; a mixer for mixing waves from said oscillator with received signals to produce space and mark signals of predetermined but different frequencies on both sides of a mean frequency; output means from said mixer, said output means comprising a space filter and a mark filter, said filters respectively passing only the space and mark signals, and individual outputs from said filters for connection to utilization devices for space and mark signals, a second local oscillator producing a mixing signal having a frequency which is a multiple of the difference in frequency of the space and mark signals, said multiple being not over two, a mixer means mixing the signals from said second local oscillator and at least one signal of said space and mark signals; a third filter and discriminator connected thereto tuned to a signal from said mixer means; connection means connecting said third filter to the output of said mixer means; means connecting said discriminator to said control means of said first oscillator, said second oscillator producing mixing signals equal to the difference frequency between said space and mark signals, and connection means connecting said mixer means solely to one of said space and mark filters and said second local oscillator.

References Cited in the file of this patent

UNITED STATES PATENTS

| | | |
|---|---|---|
| 2,341,649 | Peterson | Feb. 15, 1944 |
| 2,378,299 | Hilferty | June 12, 1945 |
| 2,509,212 | Cook et al. | May 30, 1950 |
| 2,715,677 | Turner | Aug. 16, 1955 |